United States Patent [19]
Lewis

[11] 3,942,822
[45] Mar. 9, 1976

[54] UPRIGHT BIKE BAR

[76] Inventor: Nathanial H. Lewis, P.O. Box 20424, Los Angeles, Calif. 90006

[22] Filed: Aug. 16, 1974

[21] Appl. No.: 498,644

[52] U.S. Cl. .......... 280/289; 24/81 LC; 24/243 LC; 74/551.3; 280/263
[51] Int. Cl.² .......................................... B62K 21/26
[58] Field of Search .......... 280/263, 289; 74/551.3; 248/221; 24/243 LC, 81 LC

[56] References Cited
UNITED STATES PATENTS

| | | | |
|---|---|---|---|
| 2,594,451 | 4/1952 | Konsel | 280/263 |
| 3,065,981 | 11/1962 | Arrison | 24/81 LC X |
| 3,185,509 | 5/1965 | Welsher | 24/243 LC |
| 3,336,048 | 8/1967 | Paducki | 280/289 |
| 3,438,651 | 4/1969 | Hertoghe et al. | 280/289 |
| 3,452,955 | 7/1969 | Hartwig | 248/316 D X |

FOREIGN PATENTS OR APPLICATIONS

| | | | |
|---|---|---|---|
| 601,729 | 8/1934 | Germany | 280/263 |

*Primary Examiner*—Robert R. Song
*Assistant Examiner*—John P. Silverstrim

[57] ABSTRACT

This accessory comprises a mounting assembly and a handle assembly. The mounting assembly can be mounted and secure upon a bike's handlebar, and it can be rotated in a complete circle around the handlebar, if necessary. The handle assembly can be rotated in a complete circle and can be moved up or down, within the mounting-unit. Thereby, this handle assembly will have movements in all directions, upon a bike's handlebar. And it can be folded down close and parallel to the handlebar, when not in use.

1 Claim, 2 Drawing Figures

U.S. Patent   March 9, 1976   3,942,822
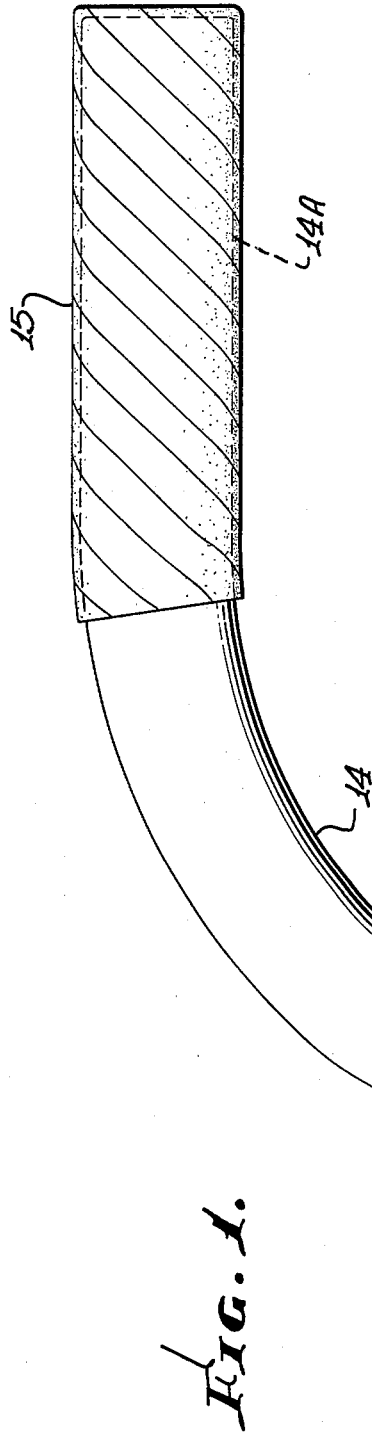
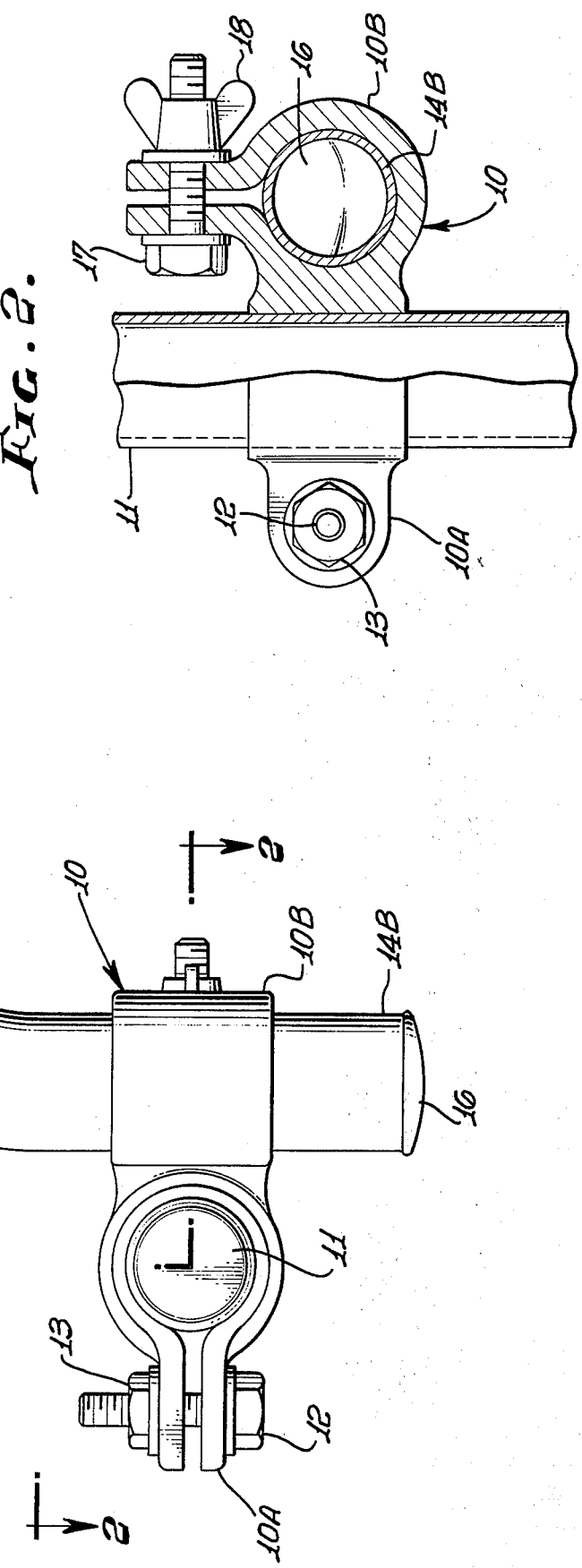

UPRIGHT BIKE BAR

This upright bike bar comprises a mounting assembly and a handle assembly. It is designed to allow movements of the handle assembly in all directions, upon a handlebar of any type of bike. Therefore, it can be folded down when not needed. It is compact and lightweight. And it will not interfere with other devices or parts upon a bike, due to its great movability.

A rider will be able to ride in a complete upright position. There are several occasions when this would be very desirable and/or useful. First, when the wind is blowing to the back of a rider, his body can act as a sail. Second, whenever a rider is coasting down an incline or hill. Third, when on a long distance (or short one) tour. Occasionally, the changing of riding position from an efficient bent-over position, to an upright one will be relaxing. Fourth, it is also relaxing to ride in an upright position, with the bike in a low to medium gear, and while pedaling slow. And fifth, small-to-medium size packages can be carried better in an upright position, at a safe speed naturally. The above are the major advantages of this bike bar.

The great bike boom throughout the entire world, has brought back this efficient machine, in increasing numbers. Thereby making this easily attachable bike bar, a very useful accessory for most bikes.

FIG. 1 is a side view of the bike bar mounted on a bike's handlebar;

FIG. 2 is a partial cross sectional top view of the mounting assembly, taken along line 2—2 of FIG. 1.

Refer to FIG. 1. The mounting assembly will comprise a mounting-unit 10 with two holes that are perpendicular to one another. The hole for a handlebar 11 is at one end 10A. While the hole for the handle assembly is at the other end 10B, refer to FIG. 2 and then back to FIG. 1. The mounting-unit 10 is secured to a bike's handlebar 11 with a bolt 12 and a square or hexagon nut 13.

The handle assembly will comprise a tube with a 90° bend 14, a straight portion 14A with a safe and comfortable grip 15. The other straight portion 14B will be mounted in the mounting-unit 10, and can be moved up or down in it. And this portion 14B will have a permanent cap 16 at its end, for security and good appearance reasons.

Refer to FIG. 2. The straight portion 14B can be rotated in a complete circle also, in the hole of the mounting-unit 10. And it can be secured in any desired position by a bolt 17 and a wing nut 18, at one end 10B of the mounting-unit 10.

The mounting assembly can be mounted and secured upon a bike's handlebar, and it can be rotated in a complete circle around the handlebar, if necessary. The handle assembly can be rotated in a complete circle and can be moved up or down, within the mounting-unit. Thereby, this bike bar would allow a rider to ride in a complete upright position when so desired. And since this handle assembly will have movements in all directions, it can be folded down close and parallel to any bike's handlebar, when not needed. And it can be mounted on either side of a bike.

The figures have been drawn to the exact size, of an actual bike bar mounted on a handlebar. And both assemblies can be made of a metal or a non-metal. The dropped handlebars of the 10-speed models would benefit the most from such a bike bar. And they are the most popular and numerous models throughout the entire world. The tooling, manufacturing, and packaging needed to place a bike bar on the market, is on a level that can be classified as very simple and very economically, relatively speaking.

The following is claimed:

1. A bike bar attachment for a vehicle having a handlebar, said attachment comprising a tube having a right angle bend, a hand grip mounted on one end of said tube, a cap closing the other end of said tube, a mounting assembly having two through openings, the center lines of said openings being mutually perpendicular and non-intersecting, said handle bar being slidably and pivotally received through one of said openings, and said other end of said tube being slidably and pivotally received through the other of said openings, and a bolt-nut combination for each of said openings, adjustably tightening said openings about said handle bar and said tube to prevent said slidability and said pivotability.

* * * * *